United States Patent [19]
Berlivet et al.

[11] Patent Number: 5,046,918
[45] Date of Patent: Sep. 10, 1991

[54] DEVICE FOR GROUPING BALES OF FODDER

[75] Inventors: Marc A. Berlivet, La Chapelle Hermier; Jean J. H. Barreteau, St-Gilles Croix De Vie; Michel H. Mathis, Challans, all of France

[73] Assignee: Hesston Braud, France

[21] Appl. No.: 487,663

[22] Filed: Mar. 2, 1990

[30] Foreign Application Priority Data

Mar. 3, 1989 [FR] France .................... 89 02831

[51] Int. Cl.⁵ .............. B65G 57/08; B65G 57/32
[52] U.S. Cl. ................ 414/789.7; 414/790.5; 414/794; 414/794.2
[58] Field of Search .......... 414/789.7, 790.5, 794, 414/794.2

[56] References Cited

U.S. PATENT DOCUMENTS

| | | | |
|---|---|---|---|
| 3,375,940 | 4/1968 | Thompson et al. | 414/789.7 |
| 3,443,708 | 5/1969 | Blair | 414/789.7 X |
| 3,589,533 | 6/1971 | Miller | 414/789.7 |

FOREIGN PATENT DOCUMENTS

| | | |
|---|---|---|
| 0108277 | 5/1984 | European Pat. Off. . |
| 0247700 | 12/1987 | European Pat. Off. . |
| 1231126 | 9/1960 | France . |
| 1263664 | 5/1961 | France . |

*Primary Examiner*—Robert J. Spar
*Assistant Examiner*—Janice Krizek
*Attorney, Agent, or Firm*—Bryan, Cave, McPheeters & McRoberts

[57] ABSTRACT

A device for grouping parallelepipedic bales of fodder produced by a bale press, comprising a chassis having a forward and rear end, adapted to be drawn by the bale press, supported on at least two wheels and provided with a drawbar on the forward end thereof, wherein the chassis includes a first, upper and a second, lower pair of retractable lateral slides, the first, upper pair of said slides being placed at a level substantially corresponding to the level of the output plane of the bale press, and the second, lower pair of said slides being placed below the first, upper pair of slides at a distance therefrom approximately corresponding to the thickness of a bale, so as to define an inner space in said chassis.

7 Claims, 8 Drawing Sheets

FIG_1

FIG_2

FIG_9

FIG_8

FIG_10

DEVICE FOR GROUPING BALES OF FODDER

FIELD OF THE INVENTION

The present invention concerns a device for grouping bales of fodder, particularly for grouping by stacking two parallelepipedic bales produced by a bale press.

BACKGROUND OF THE INVENTION

Bale presses, sometimes referred to as hay making machinery capable of producing hay, straw or other fodder bales of large rectangular dimensions, for instance of the order 30×30×60 or 40×50×100 inches (80×80×150 or 100×120×250 centimeters) have been available for a number of years. Inspite of the considerable financial outlay that which the purchase of such machines entails, they rapidly gained popularity particularly for very large farms. Such machines are however extremely costly, of considerable size and weight, and often require high powered tractors for their use. A need has been felt for bale presses of an intermediate size, better adapted to medium scale farms, and producing bales of which the thickness would be half of that of the bales produced by larger machines, that is on the order of 15 to 20 inches (40 to 50 cm).

However, for the same tonnage of fodder, the number of bales required is doubled with such intermediate capacity machines, increasing therefore the number of machine cycles and the cost of handling the bales.

BRIEF SUMMARY OF THE INVENTION

In order to overcome this drawback, the object of the present invention is a device for grouping two parallelepipedic bales produced by such bale presses by superposition whereby pairs of stacked bales, the combined dimensions and weight of which substantially equal those produced by large bale presses, can be handled together.

According to the invention the grouper for fodder bales is a device drawn by the bale press and comprising a chassis supported on at least two wheels and provided with drawbar. The grouper is characterized in that the chassis comprises two pairs of retractable lateral slides, a first or upper pair of slides being placed at a level substantially corresponding to the level of the output plane of the bale press, while the second or lower pair of slides is placed below the first pair and a distance therefrom corresponding approximately to the thickness of a bale.

In use, the grouper receives a first bale onto the upper pair of slides directly on the output plane of the bale press, then after retraction of the upper pair of slides, the bale falls to the lower slides. A second bale is then received above the first bale. Finally, the two bales thus superposed are freed together by retraction of the lower slides.

BRIEF DESCRIPTION OF THE DRAWINGS

Further details and advantages of the invention will become clearly apparent in the following description in which reference is had to the annexed drawings, in which.

DETAILED DESCRIPTION OF THE PREFERRED EMBODIMENT

Figure 1:
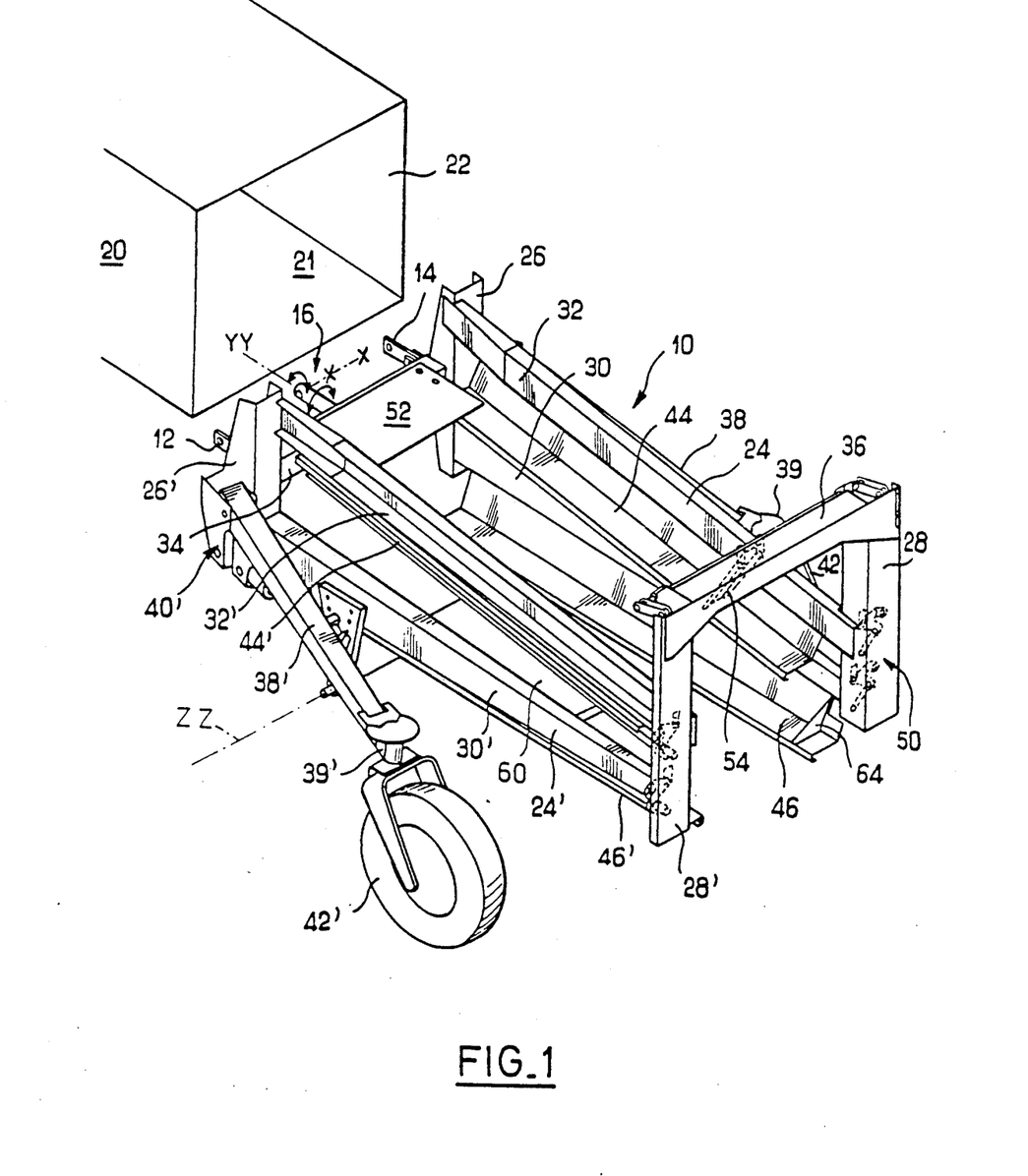
FIG. 1 is a perspective view of a grouping device for bales according to the invention.

The grouping device 10 shown empty in FIG. 1 is adapted to be drawn behind a bale press 20 (not represented in detail), from the discharge end 22 of which compressed fodder bales are discharged.

The bale press may be of any known type, producing rectangular or parallelepipedic bales the width and length of which are substantially equal to those produced by large machines, that is on the order of 30 to 50 inches (80 to 120 cm) in width and 60 to 100 inches (150 to 250 cm) in length. However, the height of the bales is only half of that of conventional large bales, on the order of 15 to 25 inches (40 to 60 cm).

The bale grouping device is hitched to a bale press by means of a pair of lateral connecting bars 12, 14 and a central hitch or drawbar 16 having two rotational axes, a transversal XX axis and longitudinal YY axis in order to maintain substantially constant alignment with the discharge end 22 of the bale press.

The bale grouping device comprises a chassis having a right and a left side 24 and 24' respectively. Each side of the chassis is formed of two vertical beams, forward 26, 26' and rear 28, 28' respectively and longitudinal beams connecting the two vertical beams. A first lower longitudinal beam 30, 30' extends generally horizontally whereas an upper longitudinal beam 32, 32' is inclined downwardly from the forward end of the chassis toward the rear end thereof, the vertical distance between the lower and upper beams at the forward end of the chassis being substantially equal or slightly greater than the thickness of a bale.

The two sides 24, 24' of the chassis are mutually connected at the forward end thereof by a medium transversal beam 34 between the forward vertical beams 26, 26', which supports the central hitch 16; and at the rear end thereof by an upper transversal beam 36 between the uppermost ends of the rear vertical beams 28 and 28'.

Figure 2:
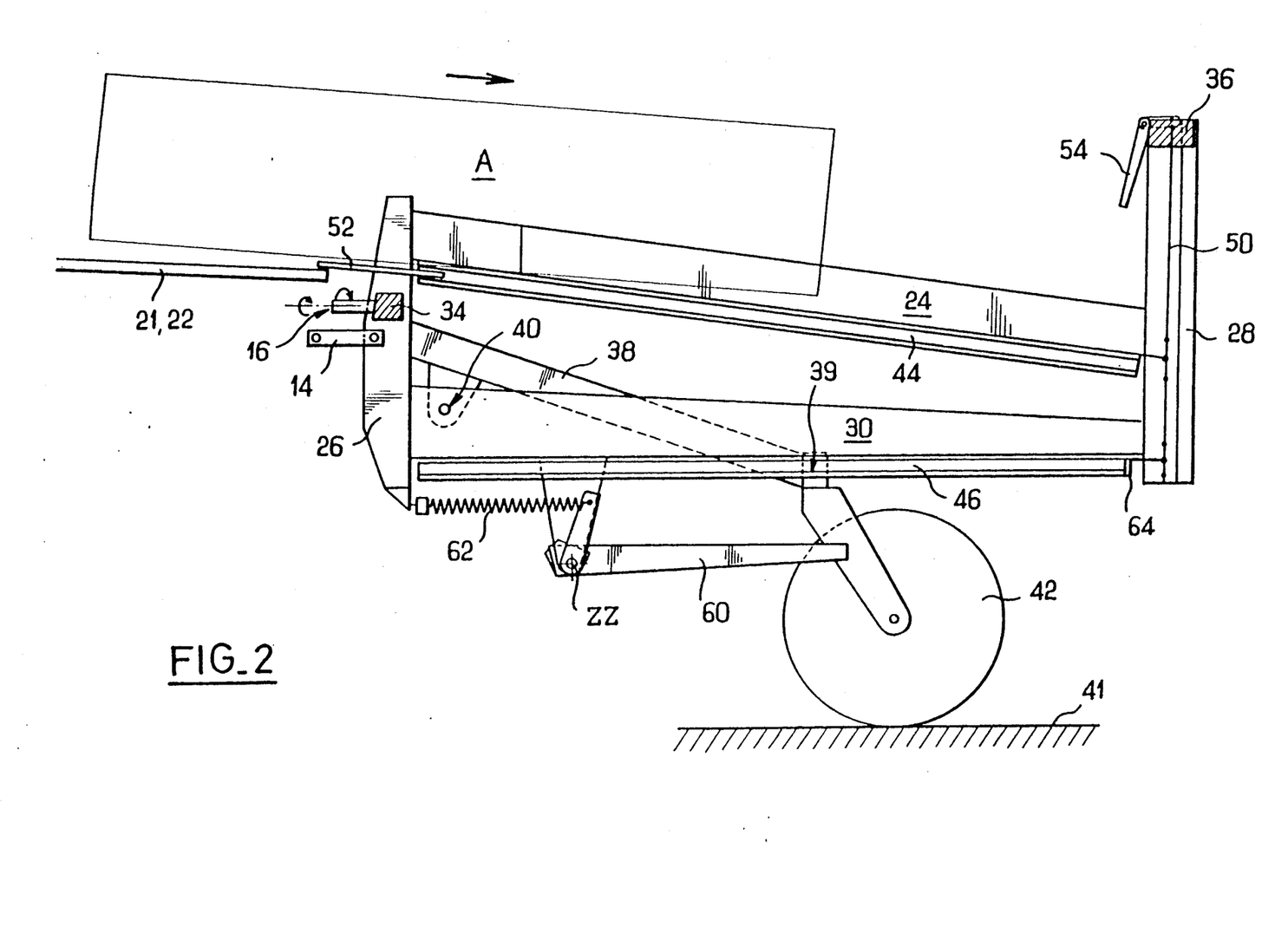
FIG. 2 through 10 are partial schematic views illustrating the operation of the invention.

On either side of the framework thus constructed, are provided wheel supports 38, 38', articulated toward the forward end of the chassis on the forward vertical beams 26, 26' by means of shock absorbing pivot joints 40 see FIG. 2, 40'. The wheel supports are inclined downwardly toward the rear end of the chassis and are provided at their distal end with wheels mounted to freely pivot about a generally vertical axis 39, 39'. Such wheels, generally referred to as jockey wheels 42, 42', are provided with a brake for limiting uncontrolled oscillation of the wheel pivoting.

Two retractable slides 44, 44' are disposed longitudinally beneath the two upper beams 32, 32'. The slides have a generally L-shaped cross-section comprising two substantially orthogonal branches, a vertical branch extending beneath the beam and substantially over the entire length thereof, being mounted beneath the beam in such a way as to allow the slide to be tilted about a longitudinal axis generally coincident with the upper edge of the vertical branch thereof.

The slides are adapted to be tiltable, by actuation of a trigger mechanism 50 which will be described hereinafter, from a holding position in which the second branch of each slide extends substantially horizontally and protrudes into the inner space defined by and separating the two sides 24, 24' of the chassis, and a retracted position in which the lower branch of the slides is tilted downwardly and extends beneath the beam, hence outside of the inner space separating the sides 24, 24'.

It will be understood that the two slides 44, 44' are mounted beneath the upper lateral beams 32, 32' in the same manner opposed to one another symmetrically.

In a similar way, two retractable slides 46, 46' of similar structure and also controlled by the trigger mechanism 50, are mounted beneath the lower horizontal beams 30, 30'.

In FIG. 1, the bale grouping and stacking device is shown empty, the two pairs of slides 44, 44' and 46, 46' being in their holding position protruding into the free space between the sides 24, 24' of the chassis. A transition plate 52 extends from the lower internal surface of the discharge end 22 of the bale press to the beginning forward zone of the upper slides 44, 44', providing support for bales during their passage toward the grouping device.

In FIG. 2, which schematically illustrates a longitudinal cross-section of the bale grouping device, a first bale A is shown progressing from the discharge 22 of the bale press, over the transition plate 52 and onto the upper slides 44, 44' maintained in their holding position by the trigger mechanism 50.

Figure 3:
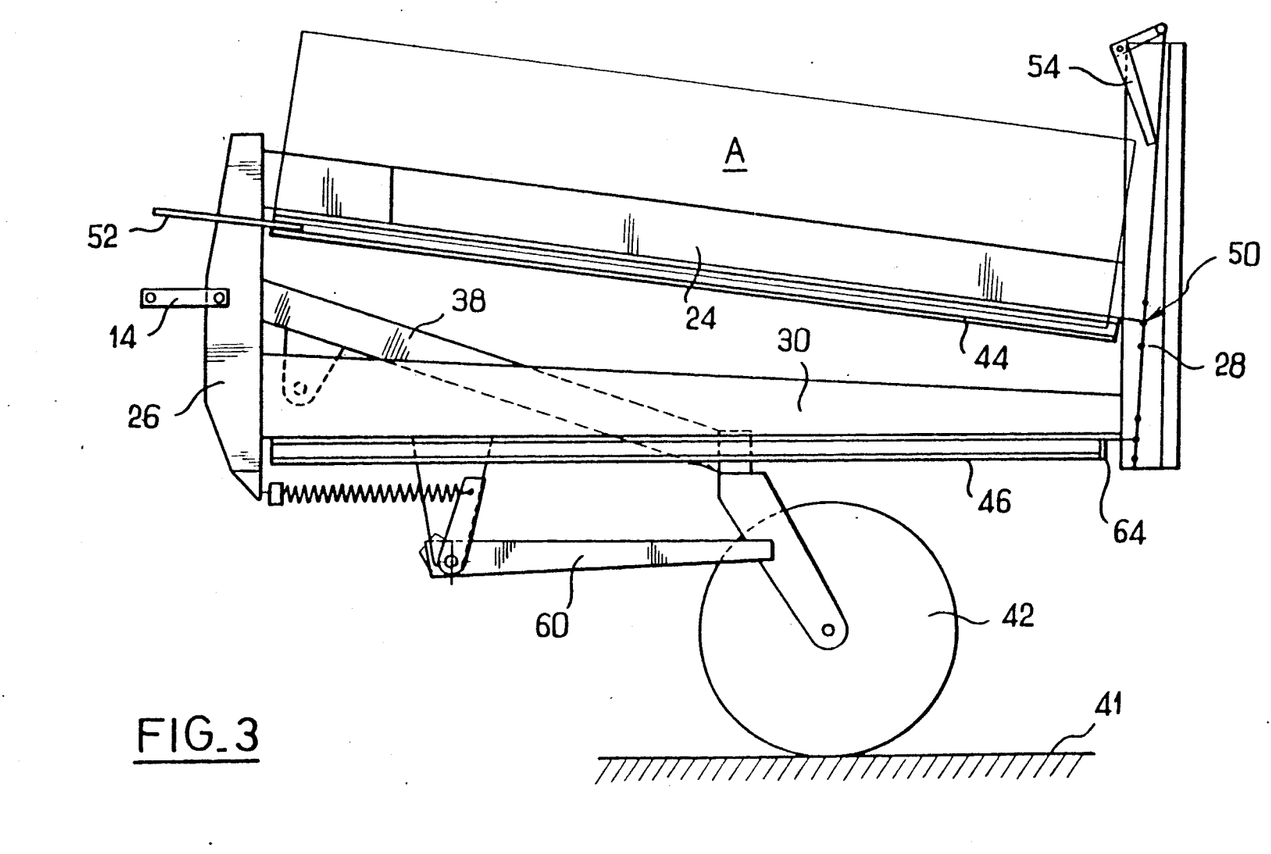
Figure 4:
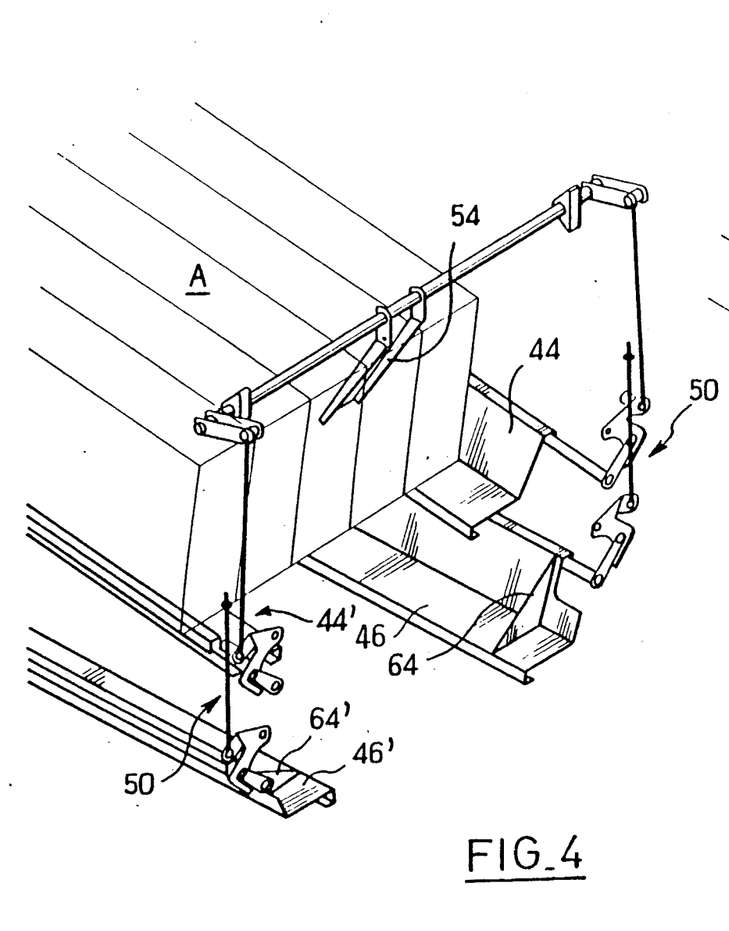
Figure 5:
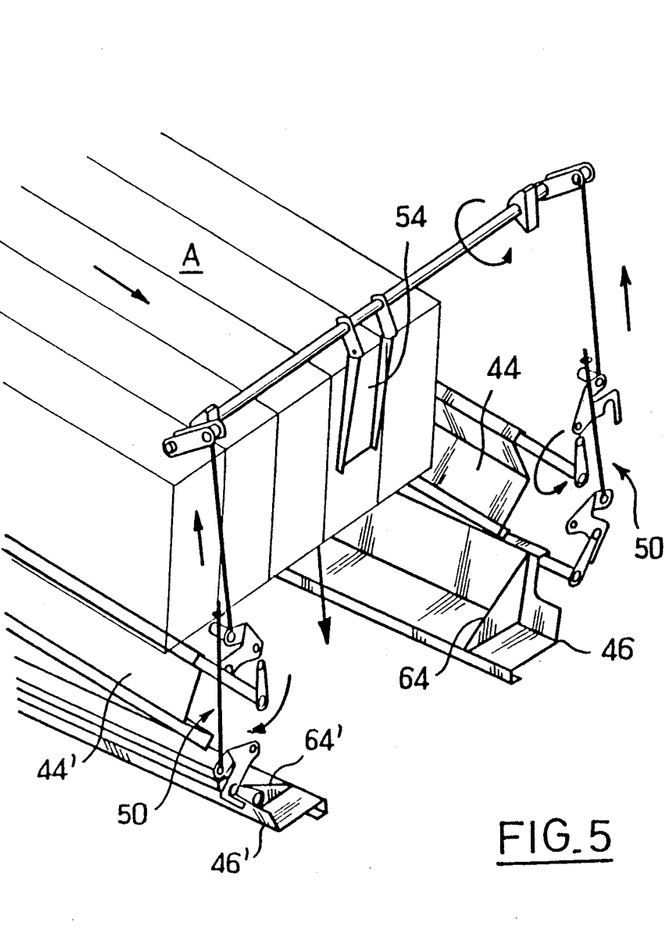

As shown in FIGS. 3 and 5, once the bale A has reached the rear end of the upper slides 44, 44', it pushes a control lever 54 forming part of the trigger mechanism 50, resulting in the freeing of the upper slides 44, 44' which, beneath the weight of the bale A, tilt into retracted position beneath the upper longitudinal beams.

Figure 6:
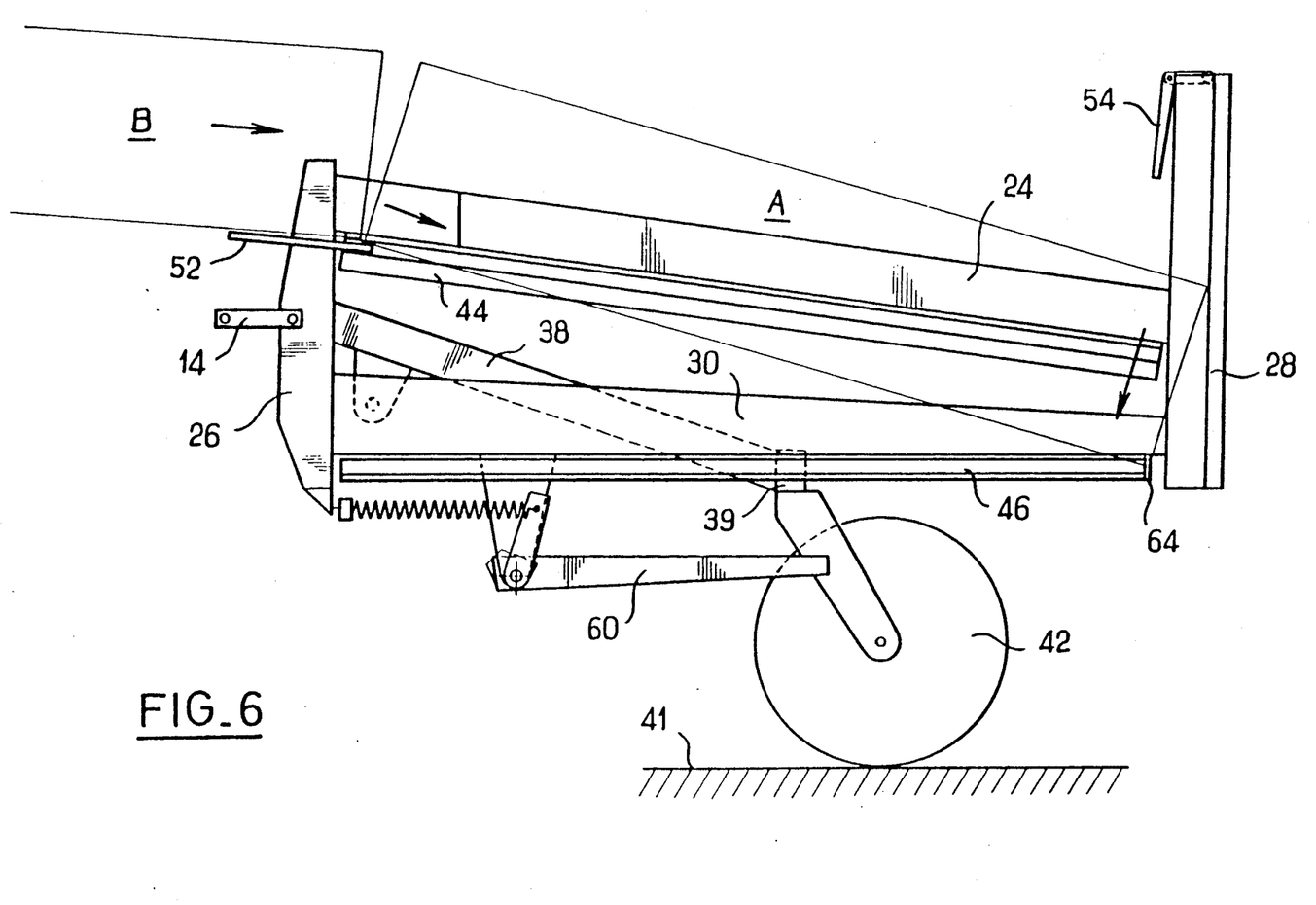
Figure 7:
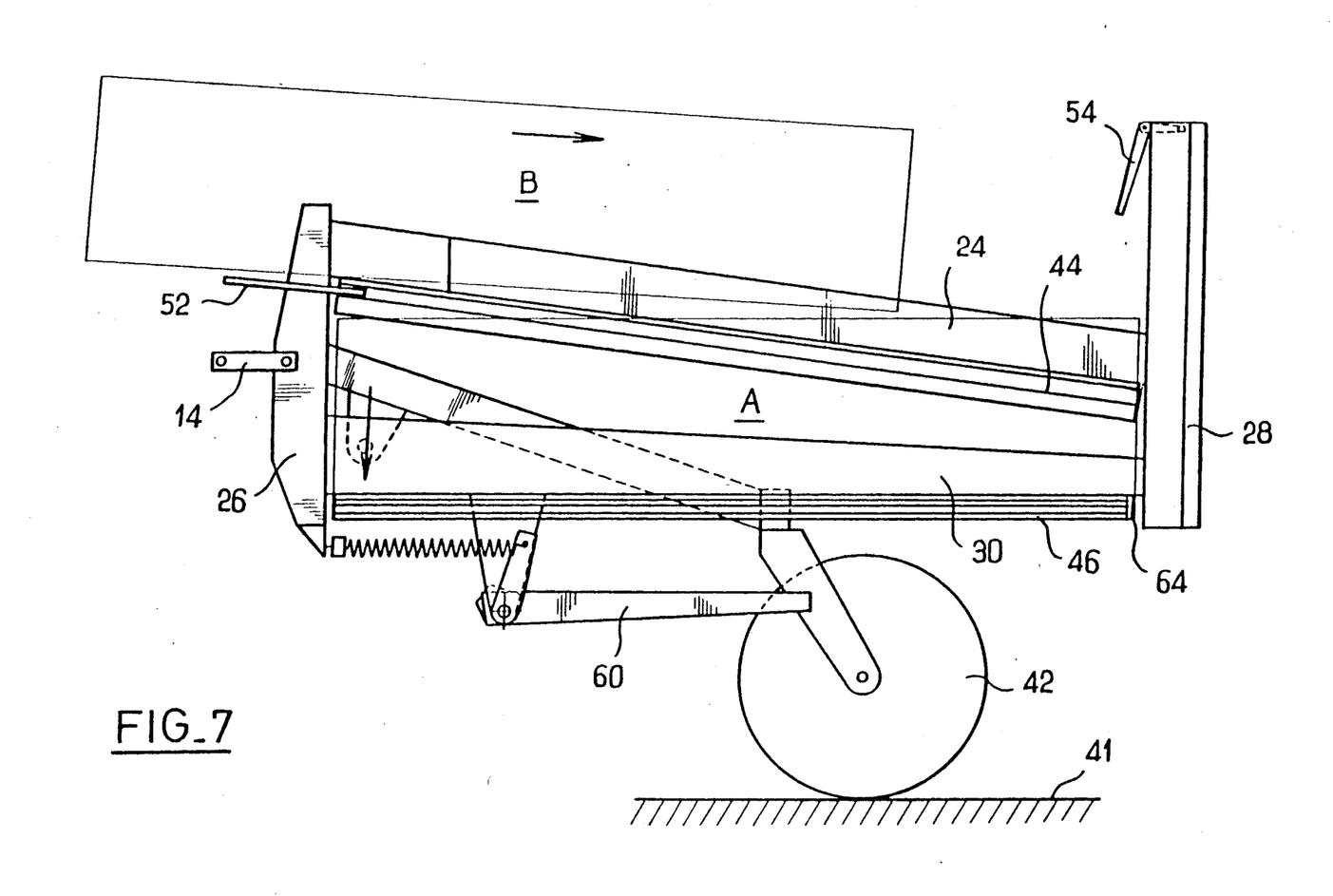
Figure 8:
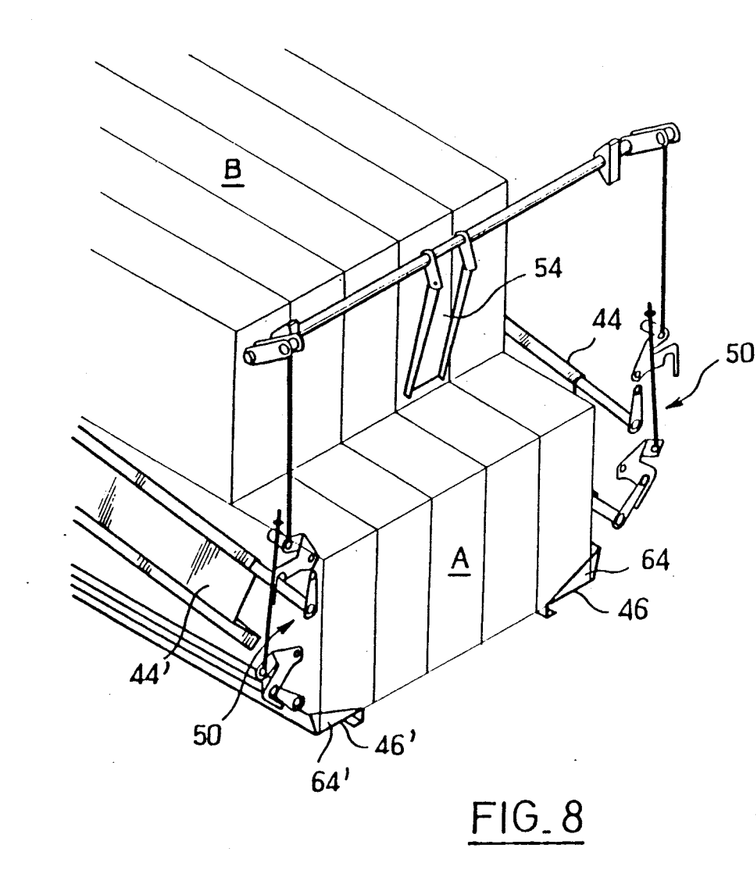
Figure 9:
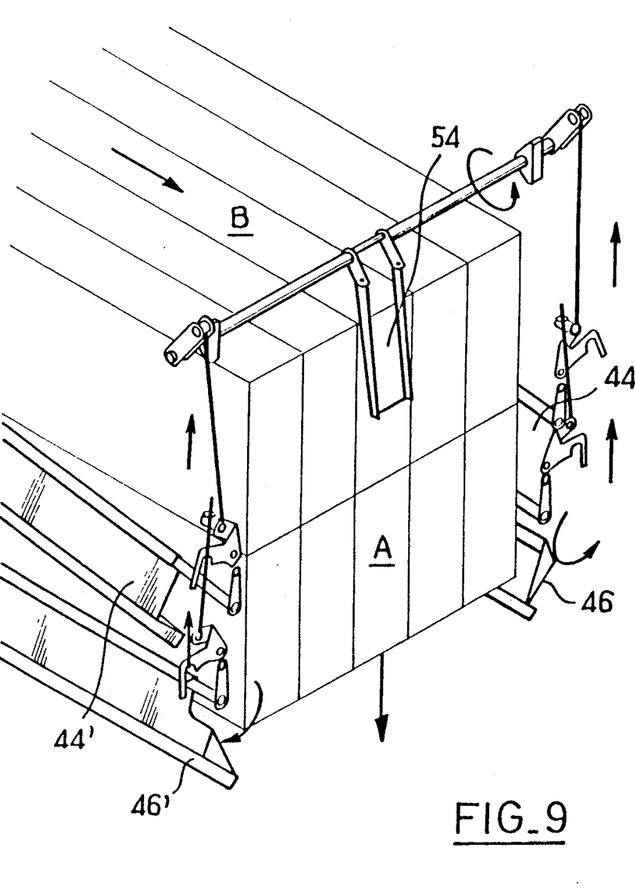
Figure 10:
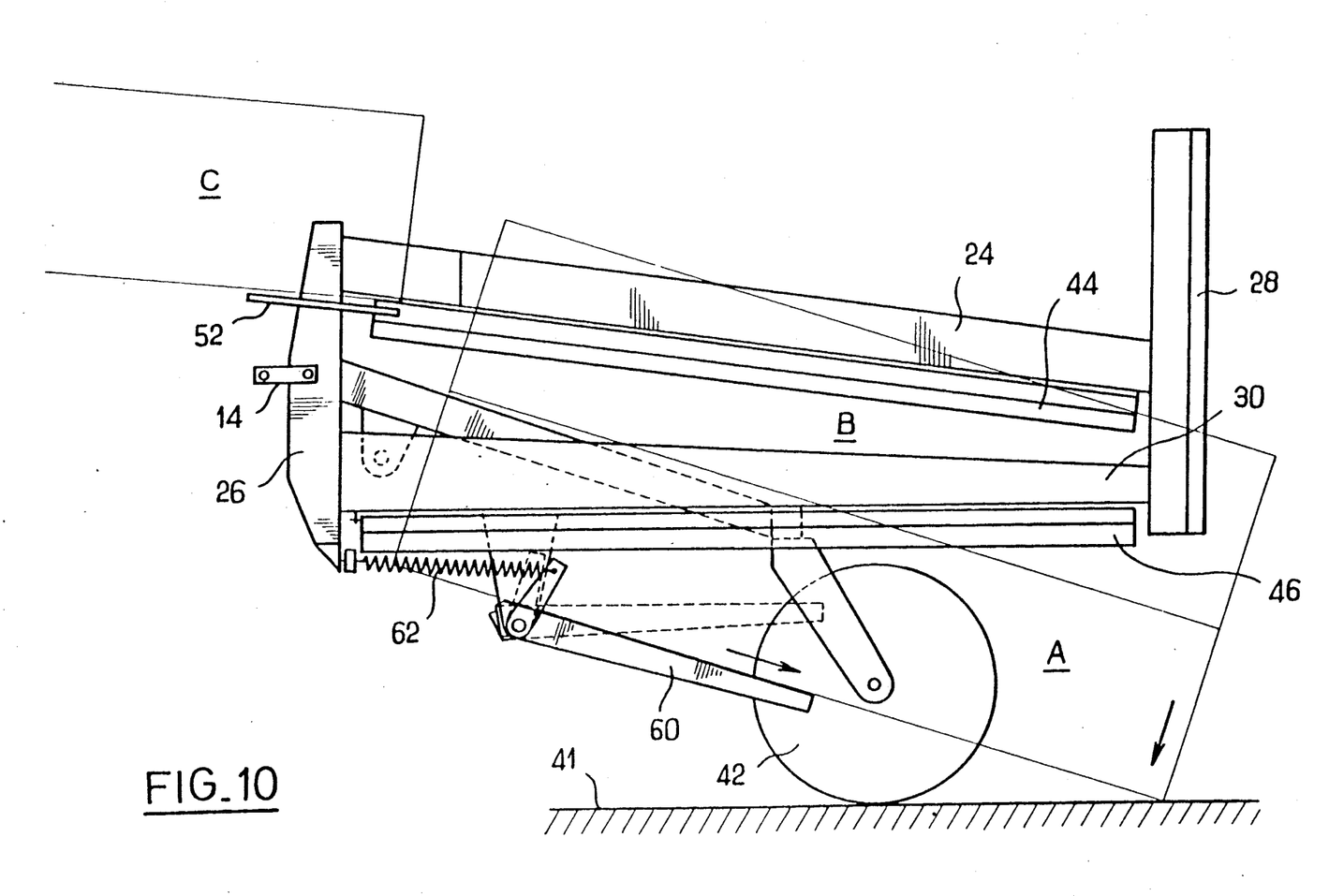

The rear end of the bale A, shown at the right in FIG. 3, is thus lowered until it contacts the lower slides 46 and 46', as shown in FIG. 6, the forward end temporarily being supported in an elevated position by the tip of the transition plate 52. As soon as the following bale B is displaced on the transition plate 52, it pushes the forward end of the first bale A which thus slips off the tip of the transition plate and falls onto the lower slides 46, 46'. The second bale B progresses over the transition plate and across the upper surface of the first bale A as shown in FIGS. 7 and 8 until the rear end thereof is generally flush with that of the first bale, as shown in FIG. 9, at which point it contacts the control lever 54 of the trigger mechanism 50.

The trigger mechanism 50 then frees the lower slides which tilt into retracted position due to the weight of the two bales, and the bales begin dropping toward the ground.

A discharge plate 60 is provided between the two lower slides and at a level slightly beneath the latter generally toward the center longitudinally of the device, for cushioning the fall of the bales. The discharge plate is articulated at its forward end about a transversal axis ZZ and biased in a raised rest position by means of a spring 62.

Thus as the bales begin to fall towards the ground, only the rearmost lower edge of the first bale A is in contact with the ground, whereas the forward portion of the lower face of the first bale A contacts the discharge plate 60 which guides the bales progressively toward the ground.

By virtue of this arrangement, the lowering of the two bales toward the ground is accomplished progressively, as is the deceleration of the bales which must simultaneously bring them from the speed of the tractor/bale press/stacker speed to rest behind the machine group. Indeed, if the two bales are dropped suddenly, a transitory crushing of the two bales can be observed immediately followed by a rebound. In such a case, because the kinetic energy of the upper bale B is not yet completely dissipated at the time of the rebound, the upper bale would tend to advance slightly in an uncontrolled way in the longitudinal direction with respect to the lower bale A.

On the contrary, the invention affords the progressive lowering and deceleration of the two bales as well as a contact with the ground which is practically without rebound, the two bales remaining practically perfectly superposed.

Once the two bales are lowered onto the ground, the continued advancement of the grouping device allows the slides automatically to once again assume their holding positions due to springs (not shown) associated with the trigger mechanism 50.

In referring to FIGS. 7 and 8, because the second bale B advances by sliding along the upper surface of the first bale, it would tend to push the latter slightly toward the rear of the device. This is avoided by providing transversal gussets 64, 64' on the rear ends of the lower slides, which serve as abutments for the lower rear corners of the first bale A and preclude positively any displacement thereof toward the rear.

During the tilting of the lower retractable slides 46, 46', the gussets undergo the same tilting movement and free the corners of the lower bale A which is allowed to drop toward the ground and discharge toward the rear with respect to the grouping device.

It will be appreciated that the tilting movement of the slides 44, 44' and 46, 46' must be perfectly synchronized in order to avoid the possibility of the first bale dropping cross-wise from the upper slides toward the lower slides then from the lower slides toward the ground. Such malfunction could at best result in the discharging of the bales onto the ground instead of stacked and at worst in the complete blockage of the grouping device and practically certainly cause damage thereto.

With this in mind, the trigger mechanism 50 comprises elements necessary for complete adjustment in order to obtain such synchronization. Advantageously, a linkage especially adapted for inversed lever synchronization is provided on the rear end of the grouping device, by which the slides are forced to tilt precisely simultaneously even should the control mechanism 50 fall out of adjustment. Such linkage is well known to persons skilled in the art and consequently is not specifically represented in the drawings.

It should be finally noted that the mechanism 50 must be designed to function in two successive sequential steps. In the first sequence, the first bale A activates the lever 54 and the mechanism allows the tilting of the upper slides in order to permit the bale to drop toward the lower slides. In the second sequence step, the second bale B activates the lever 54 and the mechanism frees the lower slides which tilt and lower the superposed bales toward the ground 41. The particular construction of such a mechanism is within the normal abilities of anyone skilled in the art and consequently does not require detailed description.

What is claimed is:

1. A device for grouping parallelepipedic bales of fodder produced by a bale press, comprising a chassis having a forward and rear end and adapted to be drawn by the bale press, said chassis being supported on at least two wheels and provided with a drawbar on the forward end thereof, wherein the chassis includes a first, upper and a second, lower pair of retractable lateral slides, the forward end of the first, upper pair of said slides being placed at a level substantially corresponding to the level of the output plane of the bale press, and the forward end of the second, lower pair of said slides being placed below the forward end of the first, upper pair of slides at a distance therefrom approximately corresponding to the thickness of a bale, so as to define an inner space of said chassis and wherein the slides of the upper pair of slides are inclined downward from the forward end to the rear end of the chassis.

2. A device according to claim 1, wherein each of said slides has an L-shaped cross section of which one branch is substantially vertical and the other branch is substantially horizontal, extends longitudinally substantially over the entire length of the chassis, is articulated about a rotational axis extending along the vertical branch of the slide, and is movable between a holding position in which the horizontal branch of the slide projects into the inner space defined by said chassis, and a retracted position in which the horizontal branch is located outside the inner space of the chassis.

3. A device according to claim 2, further comprising means for controlling the retraction of the slides.

4. A device according to claim 3, wherein said means for controlling the retraction of the slides includes a lever actuated by a bale.

5. A device according to claim 3, wherein the means for controlling the retraction of the slides is adapted to cause retraction of the upper slides, then of the lower slides.

6. A device according to claim 1, further comprising a discharge plate placed substantially between the lower slides and at a lever lower than the level of the lower slides.

7. A device according to claim 1, further comprising a transition plate placed between the forward end of the upper slides for supporting the forward end of a bale while the rear end of the same bale rests on the lower slides.

* * * * *